(No Model.)
F. H. RICHARDS.
MACHINE FOR MAKING TWIST DRILLS.
No. 320,969. Patented June 30, 1885.
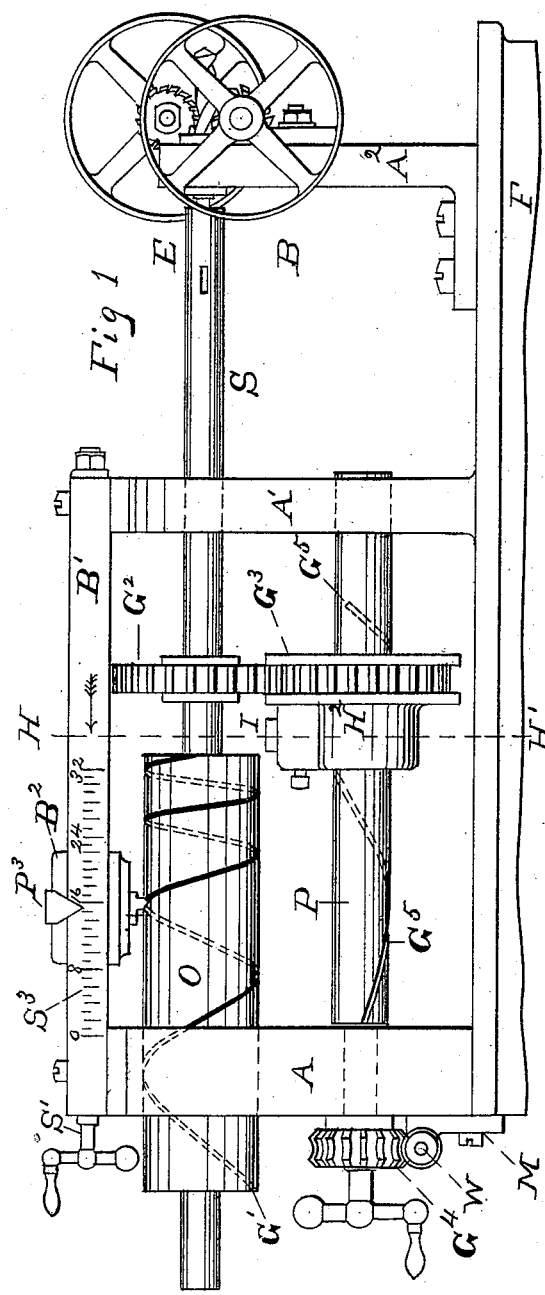
Fig 1
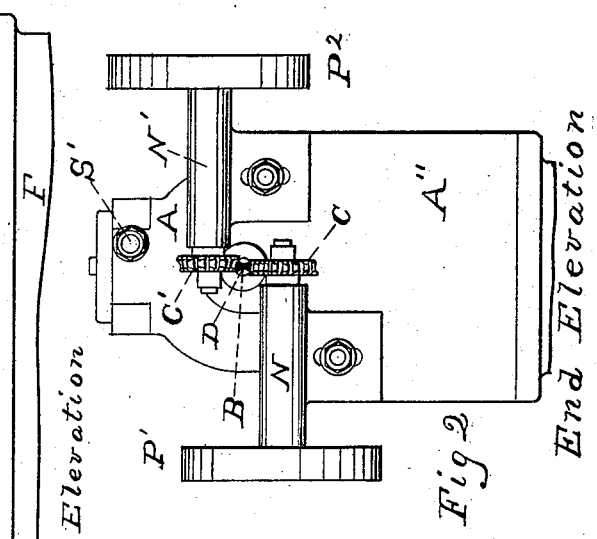
Fig 2 — End Elevation
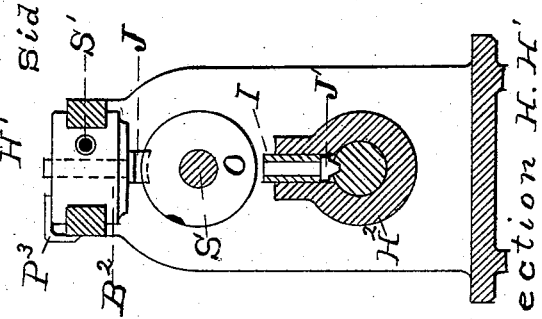
Fig 3 — Section H.H.'
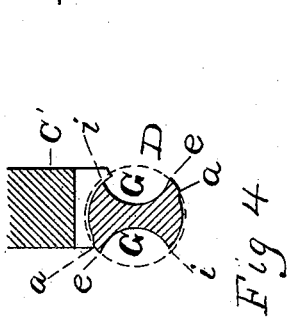
Fig 4
Witnesses
Charles Q. Palmer
Fred J. Dole.
Inventor —
Francis H. Richards

UNITED STATES PATENT OFFICE.

FRANCIS H. RICHARDS, OF CLEVELAND, OHIO, ASSIGNOR TO J. D. COX, JR., AND F. F. PRENTISS, BOTH OF SAME PLACE.

MACHINE FOR MAKING TWIST-DRILLS.

SPECIFICATION forming part of Letters Patent No. 320,969, dated June 30, 1885.

Application filed August 15, 1883. (No model.)

*To all whom it may concern:*

Be it known that I, FRANCIS H. RICHARDS, a citizen of the United States, residing at Cleveland, in the county of Cuyahoga and State of Ohio, have invented Improvements in Machines for Making Twist-Drills, of which the following is a specification, reference being had to the accompanying drawings.

My invention relates more especially to machines for making that class of twist-drills in which the grooves have an increasing pitch from the point of the drill toward the shank thereof.

The object of my invention is, chiefly, to provide means for backing off the cutting-edges of, or for making the grooves in, a series of sizes of drills by a corresponding series of adjustments of the same mechanism, and also for securing a nearly uniform rate of feed of the drill to the milling-cutters, the same being measured not axially of the drill, but in the line of the groove thereof.

For the attainment of these objects my invention consists in certain mechanism, hereinafter described, for performing operations in the making of twist-drills in which the pitch of the grooves made in said drills by means of said mechanism is determined by the pitch of the groove of a pattern-cylinder forming, for the time, a part of said mechanism.

It also consists in a method of backing off the cutting-edges of drills and in a spiral groove and mechanism whereby it acts to reduce the rotative velocity of the said pattern-cylinder proportionally as the groove thereof increases in pitch, as hereinafter more fully described.

Figure 1 is a side elevation of a twist-drill-milling machine embodying my improvements, constructed to be used for backing off the cutting-edges of drills. Fig. 2 is an elevation of the end of the machine at the right hand in Fig. 1. Fig. 3 is a section of the same in line H H'. Fig. 4 is an enlarged cross-sectional view of the drill, including a portion of the cutter for backing off the cutting-edges thereof.

In the drawings, F is the frame of a twist-drill-backing-off machine, having standards A, A', and $A^2$ formed upon or secured thereto rigidly or adjustably, as preferred. B is the bushing that supports the drill-blank D to the action of milling-cutters C C', which are carried by suitable arbors supported by any suitable bearings, N N', rotated in the proper direction by means of pulleys P' $P^2$. The cutters C C' are formed as shown most clearly in Fig. 4, having their teeth of a shape corresponding to the required slope of the relieved portion $a$ $i$ of the drill. The position of the axes of the cutters C C' is here shown situated in a vertical plane at right angles to the axis of the drill; but they may be placed at an angle thereto, if preferred, more nearly at right angles to the groove of the drill, by a suitable construction of bearings N N'. By substituting suitably-shaped cutters for the cutters C C', and setting them in a proper position, the grooves G G may be formed in a drill using the same mechanism otherwise, as for backing off the cutting-edges $e$, as herein shown and described.

The spindle S is provided at E with a suitable socket, chuck, or other device to hold the drill-blank D, and with a gear, $G^2$, whereby it is rotated. It is supported at one end by bearing A', and its opposite end passes centrally through and is supported by the pattern-cylinder O, which is supported in a bearing in standard A. This cylinder O has a spiral groove, G, formed therein, of an increasing pitch uniform with the pitch of the grooves of the drill, of which the cutting-edges thereof are to be backed off in the machine.

Secured upon the top of A and A' is a guide, B', in which a sliding block, $B^2$, is secured and arranged to be operated by screw S', and to carry the resistance-pin J, which is of a shuttle-shaped form, at its lower end, and fitted to slide in the groove G' of cylinder O and to revolve in $B^2$, to conform to the varying pitch of the said groove as the said cylinder slides by it during the operations of the machine.

A double-flanged pinion, $G^3$, meshing with $G^2$ of spindle S, is constructed to slide upon a feed-shaft, P, having a groove, $G^5$, of increasing pitch, and which is supported in bearings A A', and carries a worm-wheel, $G^4$, which is acted upon by worm W, carried in bracket-bearing M. The hub $H^2$ of pinion $G^3$ is fitted to receive a thimble, I, in which the resistance pin or key J' is fitted to revolve, so as to conform to the varying pitch of the groove G⁵. Power being applied to W, the worm-wheel G⁴ and shaft P are thereby rotated, and by means of the pinion G³ upon the latter and G² the motion is communicated to spindle S at any point of its longitudinal movement.

In operation, the pattern-cylinder O having a fixed position upon spindle S, the block B² is adjusted to such a position as will bring the resistance-pin J to act upon such a portion of the groove G' during its rotation in the operation of backing off a drill as is uniform in pitch with the pitch of the grooves of the said drill. Thus, by a series of simple adjustments of the position of the resistance-pin J relative to the pattern-cylinder O, different portions of the same pattern-groove G' are made operative, as described, thereby enabling the machine to be used for backing off a series comprising a considerable number of sizes of drills without a different pattern-cylinder.

In the drawings the machine is shown with the resistance-pin J in a position for operation upon a drill of medium size relative to the capacity of the machine. For larger drills the block B² would be moved toward the left and for smaller drills toward the right. For readily adjusting block B² to the required position for a drill of given size, a graduated scale, S³, is provided, as shown in Fig. 1, the use of which is obvious. A pointer, P³, is attached to the block B², for indicating its motion relative to the said scale.

From the nature of the feeding mechanism, consisting of worm W, worm-wheel G⁴, splined shaft P, sliding pinion G³, and gear G², it is obvious that if the spline or groove G⁵ in shaft P were parallel to the axis thereof, a uniform rotary motion applied to W would result in a uniform rotary movement of spindle S. It is also evident that in such a case the spindle S, owing to the increasing pitch of the pattern-groove G', would be moved toward the right at a constantly-increasing velocity. These two results continued uniformly would thus constantly increase the length of a drill surface or groove to be acted upon by the cutters in a given time, so that if the rate of feed were properly adjusted to the power of the cutters at the point of the drill it would be too great at the termination of the cut. To obviate this difficulty by securing a practically uniform rate of feed measured in the line of the cutting-edge of the drill, I form the groove G⁵ in shaft P spirally in a direction passing from the left toward the right, Fig. 1, opposite to its direction of rotation, so that the pinion G³ as it moves toward the right during the operation of the machine has an increasing retrograde movement relative to the shaft P sufficient to compensate for the effect described as being otherwise produced by the increasing pitch of the pattern-groove G'. The pinion G³ is shown as provided with flanges, by means of which the longitudinal motion of gear G² causes it also to slide longitudinally on shaft P. It is obvious the flanges may be placed on gear G² and effect the same result. There are also other well-known devices that are equivalents thereto, and therefore I do not limit myself to the said flanges for accomplishing the purpose described.

The spindle S is shown herein as having a socket, E, for receiving the shank of drill-blank D; but I do not limit myself to that construction, as any suitable form of chuck, clamp, or dog may be used in lieu thereof; but I have shown the form described merely to illustrate some means therefor.

I have herein used the expression "a metal-removing device" in referring to the milling-cutters C C', for the reason that the combination of drill supporting and feeding mechanism herein shown and described is also designed for use in connection with a grinding-wheel of any suitable kind as a substitute for said cutters in backing off the cutting-edges of drills, and also with milling or grinding mechanism adapted to form the grooves of drills.

In this application I have shown and described the resistance pin J to be adjustable relative to pattern-cylinder O, which is shown and described as being in a fixed position upon spindle S, for the purpose of bringing into use the different portions of the groove thereof as required; but if the resistance-pin J were constructed in a fixed position, and the pattern-cylinder O constructed to be adjusted to the required positions relative to said resistance-pin, it is obvious that the same result would be accomplished. I make no claim herein to such construction or adjustment of said pattern-cylinder; but in so far as the same may embody patentable invention I intend it to form in part the subject-matter of a separate application.

I do not claim herein any form of pattern-cylinder or of the groove therein, but in a separate application I have claimed such a cylinder with a groove therein of a curve having ordinates in a geometrical progression, and substantially such as herein shown.

Having thus described my invention, I claim—

1. In a twist-drill-making machine, the combination of a pattern-cylinder, O, having a groove, G', of increasing pitch, a resistance-pin, J, operated in said groove, and feeding mechanism having as a part thereof gears G² and G³, resistance-pin I, and a shaft, P, with a spiral groove therein, whereby the rate of feed imparted by said feeding mechanism to said cylinder O is modified, substantially as and for the purpose described.

2. In a twist-drill-milling machine, in combination, the milling-cutters C C', having a suitable form, size, and position to back off the cutting-edges of or form the grooves in a drill, a holder for holding said drill in a position to be acted on by said cutters, the pattern-cylinder O, having a groove of increasing pitch, the resistance-pin J, adapted to act in said groove, and a feeding mechanism adapted to rotate said pattern-cylinder with a decreasing velocity, for the purpose described.

3. The combination of a drill-holding spindle provided with a former of increasing pitch, a spirally-grooved feed-shaft, and connecting gearing, substantially as described, between said spindle and shaft, substantially as set forth.

4. In a drill-milling machine, the combination of a cutter, as C or C', having concave teeth corresponding to the relief of the drill, and arranged to be revolved in a plane substantially parallel to the axis of the drill, a spindle carrying said cutter, rest D, and the sliding drill-holding spindle S, substantially as described, and for the purpose specified.

5. In a drill-milling machine, the combination of a frame having fixed bearing A A', drill-holding spindle S, pattern-cylinder O, fixed on said spindle and provided with groove G', of increasing pitch, guide B', block B², and resistance-pin J, all arranged and operating substantially as described, and for the purpose specified.

FRANCIS H. RICHARDS.

Witnesses:
    CHARLES O. PALMER,
    FRED J. DOLE.